United States Patent [19]
Giese et al.

[11] Patent Number: 4,482,314
[45] Date of Patent: Nov. 13, 1984

[54] METHOD FOR HEATING CARBON BLANKS

[75] Inventors: Hans-Joachim Giese, Hanau; Walter R. Heiker, Wertheim-Sonderriet; Wilfried Krohe, Bad Soden, all of Fed. Rep. of Germany

[73] Assignee: Sigri Elektrographit GmbH, Meitingen bei Augsburg, Fed. Rep. of Germany

[21] Appl. No.: 497,794

[22] Filed: May 24, 1983

[30] Foreign Application Priority Data

May 28, 1982 [DE] Fed. Rep. of Germany ....... 3220121

[51] Int. Cl.³ .............................................. F27B 3/02
[52] U.S. Cl. ..................................... 432/11; 432/137; 432/145; 432/146
[58] Field of Search ................. 432/11, 137, 141, 144, 432/145, 146, 148, 149, 150

[56] References Cited

U.S. PATENT DOCUMENTS

| | | | |
|---|---|---|---|
| 1,663,029 | 3/1928 | Straight | 432/137 |
| 2,181,928 | 12/1939 | Vaughan | 432/145 |
| 2,991,535 | 7/1961 | Hanley | 432/137 |
| 3,129,933 | 4/1964 | Cremer et al. | 432/144 |
| 3,172,647 | 3/1965 | Remmey | 432/145 |
| 3,744,966 | 7/1983 | Krohe et al. | 432/176 |
| 3,854,865 | 12/1974 | Fay | 432/146 |
| 4,005,981 | 2/1977 | Turnbull | 432/146 |
| 4,012,190 | 3/1977 | Dicks et al. | 432/144 |
| 4,069,010 | 1/1978 | Fay | 432/149 |
| 4,162,141 | 7/1979 | West | 432/145 |

FOREIGN PATENT DOCUMENTS 2029840 10/1973 Fed. Rep. of Germany.

*Primary Examiner*—Henry C. Yuen
*Attorney, Agent, or Firm*—Herbert L. Lerner; Laurence A. Greenberg

[57] ABSTRACT

Manufacturing of carbon bodies by heating blanks containing pyrolizable substances in a chamber over in which volatile pyrolysis products are formed and decomposed and thermal energy is generated by combustion of fluid fuels inside the chamber. Below a chamber temperature of 600° C. the fuel is burned by supplying a stoichiometric amount of air, and above a chamber temperature of 600° C. an additional quantity of air is blown into the chamber through nozzles.

5 Claims, 3 Drawing Figures

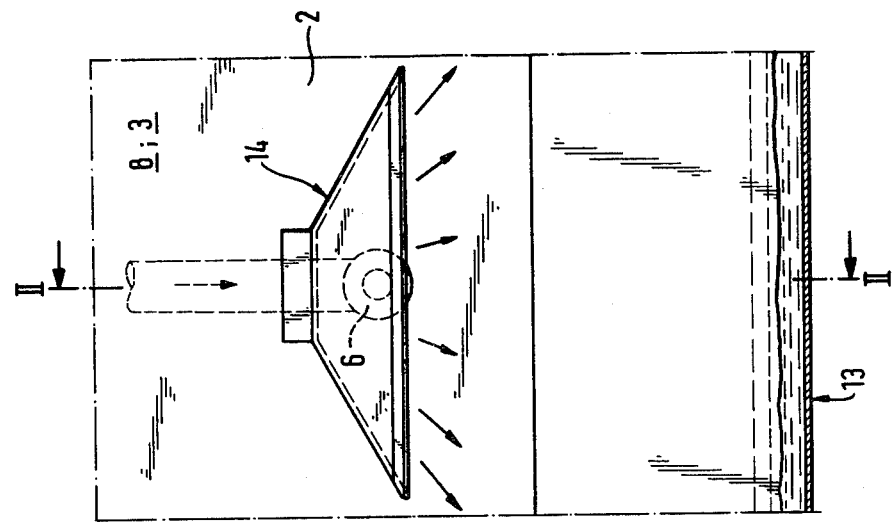
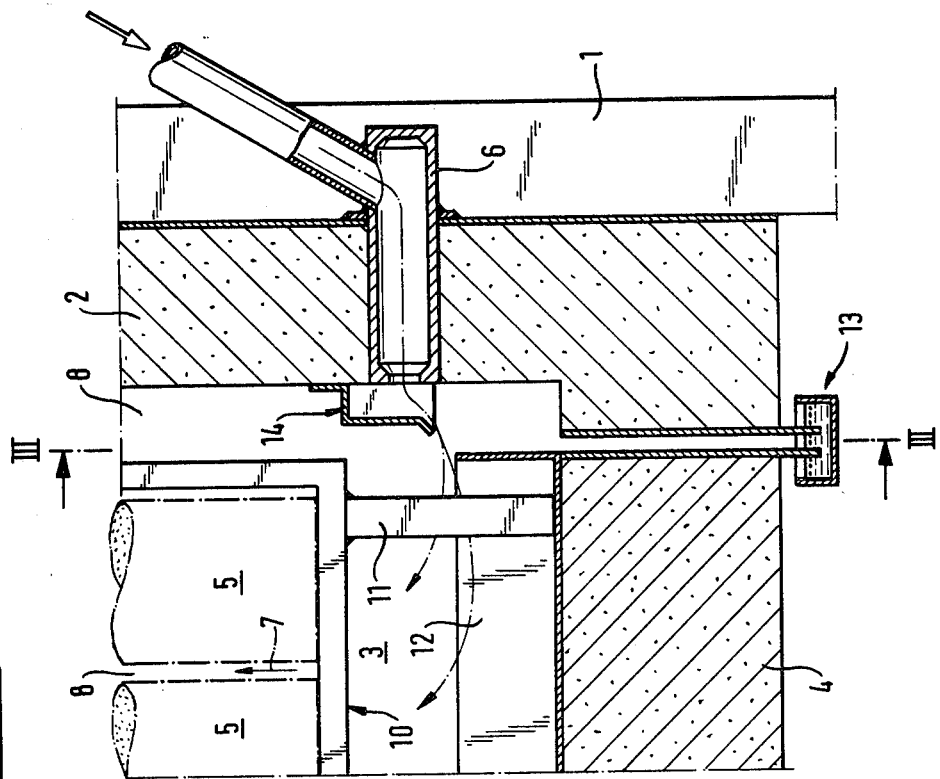

METHOD FOR HEATING CARBON BLANKS

BACKGROUND OF THE INVENTION

1. Field of the Invention

The invention relates to a method for manufacturing carbon bodies by heating blanks containing pyrolizable substances in a chamber oven, in which volatile pyrolysis products are formed and decomposed, and thermal energy for heating the blanks is generated by combustion of fluid fuels inside the chamber.

2. Description of the Prior Art

In manufacturing carbon bodies it is known to mix comminuted coke, graphite, carbon black and other substances consisting substantially of carbon with one or several binders from the group coal tar pitch, petroleum pitch, tar, synthetic resin and, to a small extent, also carbohydrates. The resultant mixture is formed into bodies by extrusion, screw extrusion die pressing or on vibration machines. In first approximation, the blanks consist of a closed binder matrix, in which solid carbon grains are dispersed. By heating the blanks, the binders are subjected to pyrolysis, whereby a binder coke skeleton joining the primary carbon grains together and volatile products, mainly hydrocarbons, are formed from the binder. The carbon bodies obtained are porous, primarily because of the pyrolysis losses, and it is known, according to another method, to impregnate the porous carbon bodies with one of the substances used as the binder. It is then necessary to subject the bodies to a second heat treatment and to coking the impregnation medium.

The heat treatment is performed for less sensitive blanks primarily in annular chamber kilns which consist of a large number of chambers connected in tandem. Controlling this compound oven is difficult, since parameter changes in one chamber of necessity affect the adjacent chambers. Predetermined operating conditions are easier to maintain in individual chamber ovens, called chamber ovens in the following, which are accordingly used for firing blanks which are sensitive to firing and also when firing with a high heating-up rate. A chamber oven of this type is described, for instance, in U.S. Pat. No. 3,048,382. The blanks to be fired are arranged in packing material consisting substantially of coke powder, and the thermal energy required for heating-up the chamber contents is generated by combustion of a fluid fuel in the space formed by the surface of the packing material and the lid of the oven. The flue gas flows through vent holes arranged in the packing material and is returned at least in part, as are the volatile pyrolysis products. The pyrolysis products are, especially at high heating-up rates, not at thermal equilibrium, so that secondary cracking products such as retort coke and particularly soot are formed at the hotter oven surfaces of the vent holes, oven walls etc., which narrow down the free flow cross section more and more. In principle, the deposition or precipitation of carbon-containing substances can be prevented by combustion of the volatile pyrolysis products, for which purpose, oxygen must be fed to the circulated flue gas. Any increase of the oxygen content, however, in the actual concentration range means increased explosion danger. For instance, at an oven temperature of 500° C. a typical composition of the circulated flue gas is as follows (in volume percent): $H_2$, 2.1%; CO, 0.8%; $CH_4$, 0.8%; polyaromatics, 0.7%; $O_2$, 1.6%; $CO_2$, 9.0%; $N_2$, 67.7%; $H_2O$, 16.5%. The explosion limit is in general not reached for the individual component, but may be reached for the mixture of the flammable components. Under the conditions mentioned as an example, the lower explosion limit is about 4.7% by volume.

The same difficulties exist regardless of the form and type of the chamber oven. Particularly obstructive are the encrustations for the operation of an oven type called shuttle kiln (bogey hearth oven), in which the material to be fired is stacked on a carriage outside the oven chamber and is run into the chamber.

SUMMARY OF THE INVENTION

It is therefore an object of the invention in a method for manufacturing carbon bodies mentioned at the outset, to eliminate or substantially reduce encrustations in a chamber oven which are formed by the decomposition of volatile pyrolysis products and interfere with the operation of the oven, and other deposits of substances consisting substantially of carbon, and to preclude an explosion danger.

With the foregoing and other objects in view, there is provided in accordance with the invention a method for manufacturing carbon bodies by heating blanks containing pyrolizable substances in a chamber oven which is heated from below 600° C. to above 600° C. and in which volatile pyrolysis products are formed and decomposed and thermal energy is generated by combustion of fluid fuels inside the chamber, the improvements comprising wherein below a chamber temperature of 600° C. the fluid fuel is burned by supplying a stoichiometric amount of air, and above a chamber temperature of 600° C. an additional quantity of air is introduced into the chamber.

Other features which are considered as characteristic for the invention are set forth in the appended claims.

Although the invention is illustrated and described herein as embodied in a method for heating carbon blanks, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which:

FIG. 2 is an enlarged view of the area II of FIG. 1, and FIG. 3 is a sectional view taken along line III—III of FIG. 2.

DETAILED DESCRIPTION OF THE INVENTION

Figure 1:
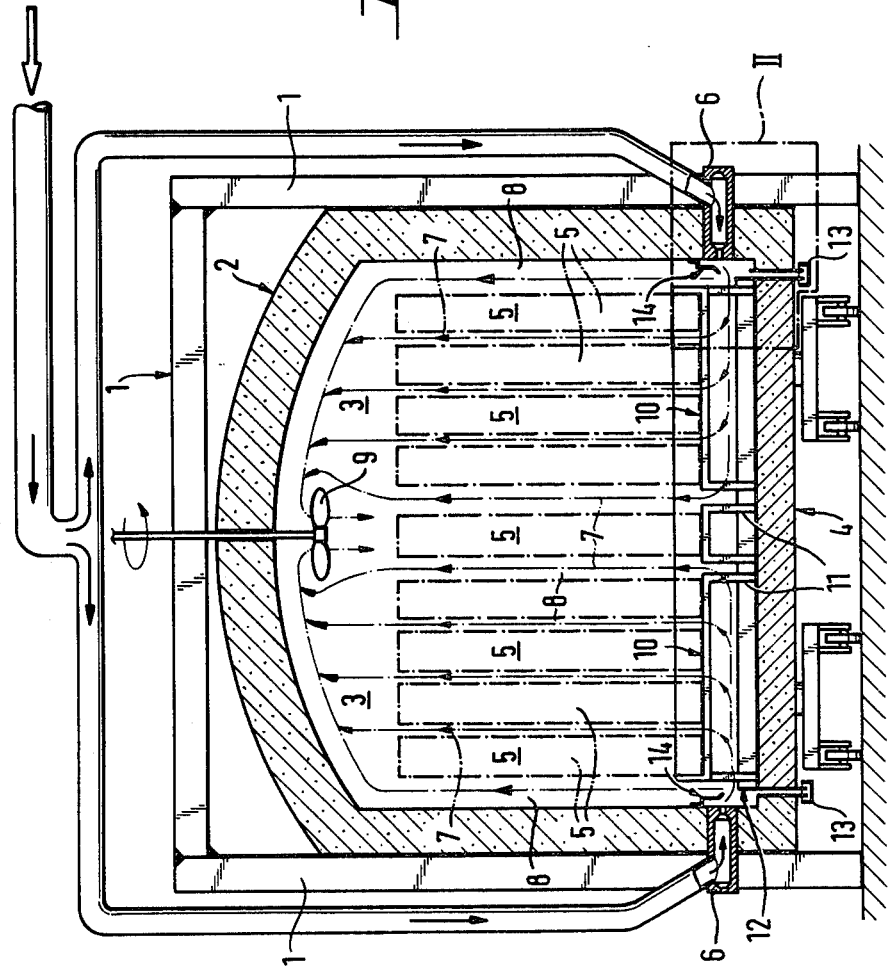
FIG. 1 diagrammatically illustrates a cross sectional view of a shuttle kiln provided with nozzles for the introduction of excess air into the chamber when it is at a temperature above 600° C., to burn the volatile pyrolysis products and deposits of solid pyrolysis product without danger of an explosion.

In accordance with the invention the fuel in the chamber is burned below a chamber temperature of 600° C. by supplying a stoichiometric amount of air. An additional amount of air is blown into the chamber through separate nozzles at a chamber temperature above 600° C. Preferably, an oxygen excess of 5 to 15%, relative to the amount of air required for the combustion of the fuel gas, is used. An advantageous distribution of the blown-in air is obtained by baffles which are arranged in front of the nozzles.

When carbon bodies which contain tar pitch or other hydrocarbons as binders or impregnation media are heated up, volatile aromatic compounds are produced in the temperature range of up to about 550° C. in the pyrolytic decomposition of the bituminous substances. At the temperatures prevailing in the oven chambers these volatile aromatic compounds are condensed in part to multi-nucleus aromatics. These substances are dispersed in the flue gas in the form of fine tar droplets, which flue gas is generated by the combustion of fluid fuels such as heating oil or natural gas. The total tar content is up to about 500 g/Nm$^3$, and part of the tar is thermally decomposed on hot oven surfaces as described above, depositing solid carbon. Above 600° C., the quantity of emitted pyrolysis products is substantially smaller and, in addition, consists predominantly of methane and hydrogen. Suprisingly, it has been found that in this range of pyrolysis, the amount of air or oxygen fed into the oven chamber can be increased to the amount required for the combustion of the solid carbon deposits without increasing the danger of an explosion. By virtue of combustion of the deposits, constrictions of the free flow cross section and limitations of the gas flow and especially in shuttle kilns, a limitation of the mobility, are avoided. The combustion heat of the carbon deposits furthermore contributes to the heat balance of the chamber oven positively.

The invention will be explained in the following by way of an example, making reference to drawings.

Referring to the drawings, 1 is the framework of the shuttle kiln, 2 the masonry defining the chamber 3, and 4 a carriage, on which carbon bodies 5 are stacked with spacing, preferably in separate saggars. Nozzles 6, to which air is fed, are worked into the masonry. The air flows through the gap-like canals 8 between the masonry 2 and the stacked carbon bodies 5 and the canals between the stacks, as is indicated in the drawing by arrows 7 and is circulated by means of blowers 9 together with the volatile pyrolysis formed during the firing of the carbon blanks in the chamber 3. The volatile pyrolysis products and the deposits of solid pyrolysis products are burned and the combustion heat is utilized for the further heating-up of the shuttle kiln. Not shown in the drawing are the burners which serve for heating the chamber below 600° C. and are fed with natural gas, heating oil or generator gas, and the feeds for combustion air which form a unit with the respective burners. The arrangement of the burners, the conduction of the flue gases and, if applicable, the pre-heating of the combustion air are shown in detail, for instance, in German DE-C No. 20 29 840, to which reference is made here.

In the embodiment according to FIGS. 1 and 2, the carbon bodies 5 to be fired are stacked in saggars 10 which are supported with their legs 11 on the hearth carriage 4. The carriage is equipped with a tray-shaped sheet metal lining 12 and a cup seal is arranged between the hearth carriage and the masonry 2.

Through the baffle 14, which is arranged in front of the nozzle 6, an amount of air sufficient for burning up the solid carbon deposits is supplied to the oven parts below the saggars and in the vicinity of the cup seal, and the deposits which are particularly detrimental to the operation of the oven in these regions are burned up completely.

To fire carbon blanks, the shuttle kiln shown as an example is heated up at a predetermined rate and up to a chamber temperature of 600° C. Fuel and air are fed-in in a ratio such that the air excess number is 1.0, i.e. no excess air. Above 600° C., the amount of air is increased, for instance, to an air excess number of 1.1, i.e. 10% excess air, then the carbon-containing deposits which interfere with the operation of the oven are completely burned without the danger of an explosion.

The foregoing is a description corresponding, in substance, to German application No. P 32 20 162.1, dated May 28, 1982, international priority of which is being claimed for the instant application. Any material discrepancies between the foregoing specification and the specification of the aforementioned corresponding German application are to be resolved in favor of the latter.

We claim:

1. In a method for manufacturing carbon bodies by heating blanks containing pyrolizable substances in a chamber oven which is heated from below 600° C. to above 600° C. and in which volatile pyrolysis products are formed and decomposed and thermal energy is generated by combustion of fluid fuel inside the chamber, the improvements comprising wherein below a chamber temperature of 600° the fluid fuel is burned by supplying a stoichiometric amount of air, and above a chamber temperature of 600° C. an additional quantity of air is introduced into the chamber, wherein part of the pyrolysis products condense and precipitate, and wherein above the chamber temperature of 600° C., air is blown into the chamber in an amount sufficient to burn the precipitated pyrolysis products.

2. Method according to claim 1, wherein the additional quantity of air is 5 to 15% in excess of said stoichiometric amount.

3. Method according to claim 1, wherein the chamber oven is a shuttle kiln.

4. Method according to claim 1, wherein the additional quantity of air is blown into the chamber through nozzles.

5. Method according to claim 4, wherein the additional air blown into the chamber is distributed by baffles arranged in front of the nozzles.

* * * * *

UNITED STATES PATENT AND TRADEMARK OFFICE
CERTIFICATE OF CORRECTION

PATENT NO. : 4,482,314
DATED : November 13, 1982
INVENTOR(S) : Hans-Joachim Giese, Walter Richard Heiker, Wilfred Krohe It is certified that error appears in the above-identified patent and that said Letters Patent are hereby corrected as shown below:

In the heading, item (30), line 12,

"May 28, 1982 (DE) Fed. Rep. of Germany...3220121", should read

--May 28, 1982 (DE) Fed. Rep.of Germany...3220162--.

Signed and Sealed this

Seventeenth Day of December 1985

[SEAL]

Attest:

DONALD J. QUIGG

Attesting Officer   Commissioner of Patents and Trademarks